United States Patent Office 2,933,398
Patented Apr. 19, 1960

2,933,398
METHOD OF PRESERVING PROTEIN FOODS

Harold J. Hestnes, Wrentham, Mass.; Harold Hestnes, administrator of said Harold J. Hestnes, deceased No Drawing. Application December 6, 1956
Serial No. 626,595

1 Claim. (Cl. 99—192)

This invention relates to food products and more particularly to preservation of protein foods and it constitutes an improvement over the invention covered in my prior Patent No. 2,676,107.

There are three main causes of the spoilage of protein food flesh such as meat, fish, shell-fish and fowl. The first is bacterial decomposition, that is, rotting caused by the action of bacteria on the flesh. The second is the bio-chemical decomposition known as autolytic break-down otherwise known as self-digestion caused by the action of catabolic (destructive) enzymes inherent in the structure of the flesh and also by new autolytic enzymes which appear in the flesh after death of the organisms, known as Cathepsin. This is a disorganized metabolism which goes on in tissue after death occurs as opposed to the organized metabolism of the living tissue. In the case of meat, this autolytic decomposition has definite advantages, at least up to a partial occurrence, in that this is the "tenderizing" process resulting in the breaking down of the tough fibers and also the flavoring process which spells the difference between the toughness, bright red appearance and flat flavor of fresh meat as opposed to the tenderness, darker color and favorably developed flavor which results, for instance, from the hanging or aging of steak under favorable conditions. When it occurs beyond the favorable point in meat and when it occurs to any extent at all in fish, the flesh develops flavors which render it less tasty or even inedible. The third cause for spoilage is the dehydration of the surface of the flesh followed by oxidation and discoloration which may be otherwise described as desiccation and shriveling.

The commonly known preservation methods of refrigeration or chilling, generally accepted as the reduction in temperature of the flesh to temperatures of the order of plus 32° F. for relatively short time preservation, and of deep freezing at substantially much lower temperatures, for instance, minus 10° F. or less for the purpose of longer periods of preservation, operate on the principle that reduction of temperature inhibits bacterial action. Depending upon the kind of flesh involved, bacterial action may be brought to a stop for all practical purposes at various temperatures. In the case of fish, the bacteria affecting fish is active at very much lower temperatures than in the case of meats and fowl, and a temperature of at least as low as about minus 10° F. is considered necessary to inactivate the spoilage bacteria in fish. Most bacteria cease to grow at around 15° F., and if kept at such relatively high temperature, many will die. When the temperature is reduced further, for instance, to 0° F., the bacteria may survive. There is consequently a critical span of temperature, which goes from about 25° F. to 10° F., when bacteria are more quickly destroyed than at lower or higher temperatures. This temperature is relatively favorable to auto-digestion (unless the enzymes are inactivated as in my process).

Taking fish as an example, it is well known that the difference in taste between freshly caught fish and frozen fish is so great, particularly with respect to the more delicately flavored varieties, that with respect to flavor and texture it amounts to a difference in kind, and this, of course, results in a substantial difference in economic value. The reason for this is that while the bacterial destruction may have been arrested by deep-freezing nevertheless the protein matter is denatured and destroyed and the nature of the flesh and its components is actually changed when it is exposed to such low temperatures that crystallization of the liquid occurs. This destruction occurs because when the free and also the bound water in the flesh is crystallized by freezing even if the protoplasmic cells are not actually burst. The cell plasma extrudes from the frozen tissues because the cell membranes become permeable in the same manner as when they are denatured by heat, resulting in loss of the inherent fluid or "juices" during defrosting which otherwise provide desirable flavor and texture. The freezing may also increase the autolytic break-down because of the loss of the fluids which contain inhibitors of the autolytic enzymes; and also because of an irreversible change of the colloidal structure and break-down of emulsions, solutions and dispersions, structural changes take place as the tissues are disintegrated, resulting in a biochemically different product. Surface dehydration and oxidation also occur during freezing and are further activated by freezing.

The autolytic break-down is at least partly responsible for undesirable "fishy" odor which begins to occur almost immediately after fish is caught and which may be present to an undesirable extent even in commercially acceptable fish.

Protein food thus exposed to such disintegrating temperatures also have reduced nutritive value because of inactivation of otherwise desirably biologically active proteins.

Since refrigeration requires power in proportion to the degree of reduction of temperature, deep-freezing is undesirably expensive. The working conditions in deep freeze store rooms at such low temperatures are difficult. Since in distribution of food products, the transportation and handling problems require removal of the food products from the store rooms and exposure to much higher temperatures, the benefits of deep-freezing may be lost or at least considerably reduced since a substantial increase of temperature even for a short period of time will cause the bacteria to become active again and to resume their destructive work. Such great changes in temperature are also responsible for other causes of decomposition, such, for instance, as the dilution of the protoplasmic fluids due to the melting of the ice crystals in the flesh and on its surface which have formed from condensation of the atmosphere or spraying during the quick freezing process in some of its forms.

It is thus seen that refrigeration and deep-freezing inhibit only the bacterial decomposition of protein food or flesh while at the same time producing and increasing other forms of destruction thus resulting in a preserved flesh which is not nearly as valuable or desirable as the fresh article and which at the same time is expensive and in many respects impractical.

Accordingly, it is principal object of this invention to preserve protein foods or flesh for substantial periods of time in such a manner that the foods when ultimately used have characteristics of freshness, flavor, nutritive value, appearance and other desirable characteristics substantially equivalent to or even better than those of the fresh product. It is another object to preserve flesh at substantially more practical working temperatures than the temperatures of deep-freezing, for instance, to preserve foods at temperatures as high as 40° F. More particularly in this respect it is the object to inhibit or eliminate bacterial action at such substantially higher temperatures while at the same time also inhibiting or eliminating autolytic break-down and surface oxidation.

A further object is to preserve the food at temperatures which may desirably be below the freezing point of water while reducing the destructive effect of the low temperature by preventing crystallization of the water which otherwise results in denaturing of the proteins accompanied by the destructive changes described above, thus retaining and even increasing the natural fresh characteristics.

A further object is to preserve food at temperatures on or near the same level of atmospheric temperatures to which foods are normally exposed during transportation and distribution and thereby to provide more practical and comfortable working conditions.

A further object is to eliminate the expense of power consumption and equipment necessary for deep-freezing.

The elimination of the above described disadvantages and the achievement of other objects will be apparent from the description of my novel products and processes.

By way of example the description herein applies particularly to the treatment of fish and fish fillets, but the same treatment, process and products are applicable as well to all proteinaceous foods including meat, fowl, shell-fish and the like.

The first problem which had to be solved when preserving fish at higher temperatures was to discover and provide other weapons to resist the spoilage bacteria which become more destructively active at such higher temperatures. Since bacteria of various types depend for favorable growth on the presence of free water and of air and also upon a favorable autolytic decomposition and a nutritional environment to which the bacterial enzymes are adapted as well as on favorable temperatures, I have discovered a method and means for reducing or eliminating the air and the free water and for preventing the autolytic break-down and changing the nutritional environment favorable to bacteria which in combination is so effective according to my invention that at practical temperatures up to about 40° F. above zero the elimination of bacterial action is at least as effective and in most cases more effective than the elimination of bacterial action provided by deep-freezing.

Generally speaking, I accomplish this particular objective as well as elimination of autolytic break-down and oxidation by impregnating and coating the fish fillets with a liquefaction product of a similar fish which I treat, according to my invention in such a manner that among other things it is capable of forming a gel at temperatures of about 40°. This proteinaceous liquid contains inherent gelling agents and, under certain conditions, I may also add other gelling agents prepared from protein or starch. Prior to the formation of the gel, I may also increase the concentration of the liquefaction product and such concentration plus the gelling action has the effect of reducing the vapor pressure, i.e., increasing the surface tension of the preservative to the point where the surface energy exceeds the electro-kinetic energy at a temperature of about 50° F. As the temperature of the gel is progressively reduced below 40° F., the gelled mass contracts and exerts a squeezing action as in syneresis, and it fills the interstices in the flesh and also forms a protective coherent envelope. In the gel the water is held as bound water, which cannot freeze at normal freezing temperatures, the gel acts as an anti-freeze, and even when the temperature is reduced below the freezing point of water no ice is formed within the mass of the gel-impregnated and coated flesh. Only the water in minute amounts which may be squeezed to the outside surface of the gelled mass can freeze at temperatures below 32° F., and since this ice is out of contact with the flesh it can have no harmful effect, and no harmful freezing inside of the flesh occurs at temperatures as low as 20° F. or less. The gel preservative eliminates air from contact with the flesh thus inhibiting aerobic bacteria and the reduction of electro-kinetic energy in the gel suppresses or retards activity of the catabolic enzymes which otherwise prepare the flesh for bacterial action, by reducing the opportunity for contact between the re-active components, i.e., the catabolic enzymes and the substrate or tissue substance which produces the catabolic break-down favorable to bacteria, thereby further inhibiting bacterial action.

I thus provide a temperature range between an upper limit of about 40° F. which may be termed the temperature of solidification or gellation and a lower limit of about 20° F. which may be conveniently called the temperature of crystallization and commencement of break-down within the flesh, between which bacterial action is for all practical purposes eliminated without producing any damaging structural or bio-chemical change in the flesh structure and its natural fluids. I not only prevent loss of the natural flavor producing fluids, but in fact I add to them and produce a food product which in many cases is richer than the original.

The relative reduction of the relative vapor pressure of the fluids in the flesh to approximately 75% of normal or less, the increase of the concentration of the colloidal fluids in the flesh, the increase of the surface tension of the fluids and the gellation not only inhibit the bacterial action, but also produce a condition of bio-chemical stability in which autolytic break-down is arrested and surface oxidation is eliminated.

The liquefaction product of the invention contains proteins and protein derivatives which through hydrolysis and heating have been rendered optically inactive (racemic). It is a known fact that organisms such as bacteria, molds and yeast generally can only use optically active proteins and their derivatives as nutriants because their enzymes are not prepared to decompose the racemic proteins. The organisms will gradually produce new enzymes adapted to the racemic proteinaceous substances, but this takes time, and at temperatures of around 40° F. or lower such adapation requires a very long time, if such adaption is possible at all. The inherent autolytic enzymes including the Cathepsins (autolytic enzymes occurring after death) are also unable to decompose the proteins in the liquefaction product as these have become changed during the hydrolysis and the exposure to heat of 170° F. or more as a result of which these undergo an intramolecular change without flocculation or coagulation.

As will be pointed out, it is also a part of this invention to impose further handicaps on bacterial action under conditions where called for by the addition of anti-bacterial substances of non-toxic nature such as some of the well known anti-biotics.

Since ice crystals form in and in contact with the flesh under ordinary refrigerating conditions at or near freezing point of water, i.e., 32° F., this temperature has heretofore been the temperature of biotic destruction or denaturation of the proteins as described above, and below which disadvantageous structural and bio-chemical changes take place in the flesh being preserved by the usual means. It will now further appear that this temperature of biotic destruction has as a result of this invention been reduced at least to a point about plus 20° F., while the temperature of preservation, i.e., solidification has been raised to about plus 40° F. This provides a practical temperature range within which a great deal of the fish may be processed, stored, transported and distributed under normal rather than artificial working temperature conditions.

The practice of the invention may be described as applied to the treatment of fish fillets. I mechanically disintegrate, as by coarse crushing, and then hydrolyze the edible waste of fish from the filleting table including the heads and carcasses or frames by applying heat in the presence of water, as for instance, heating it and stirring it in a kettle. I am careful in carrying out the liquefaction process, to maintain the temperature below the boiling point of the liquid involved. The liquefaction process, that is, the hydrolysis or treatment in the presence of water may in some cases be accomplished by the use only of the natural water contained in the fish waste, or additional water may be added, and when I say that the process is carried out "in the presence of water" I intend to cover either case.

What I prefer to accomplish is a controlled or mild combined hydrolysis and autolysis in which the hydrolytic action is accelerated by adding a protease, i.e., a proteolytic enzyme conveniently of the trypsin type or Proteinases such as pepsin, papain, ficin or bromelin, and in which the autolysis is accelerated by acidification or reduction of the pH, as by the addition of an acid such for instance as hydrochloric acid, or an organic acid such as acetic acid, ascorbic acids and the like. The serum contains inhibitors of the autolytic enzymes. These inhibitors are destroyed by acids. By inactivating these inhibitors the acid activates the autolysis. I also preferably carry out the process in the presence of an edible salt which accelerates the solution of some proteins in water, preferably sodium chloride. The liquefaction process extracts and renders into what may broadly be called a solution substantially all the proteins and protein derivatives existing in the body fluids and in the cell plasma in the flesh including the gel-forming proteins such as elastin, collagen, reticulin and myosin and also all the lipoids (fats) and other fluids including carbohydrates and the other easily hydrolyzed non-structural proteins. The structural proteins (dead cell matter, bones, etc.) are preferably all left behind and not included in the liquefaction product and this omission is accomplished by proper timing of the process and control of the temperature as will be described. This is a mild or controlled autolysis and hydrolysis in that while the proteins are reduced to their derivatives proteoses, peptones and peptides, the production of free aminos which would occur during a complete hydrolysis and at temperatures at boiling or higher, are avoided. Such aminos would cause an offensive odor and the taste would be unfavorably affected. Once the proteins are broken down to their derivatives, the solution will not coagulate at boiling temperature and therefore it may be thereafter raised to a boiling temperature to sterilize it. However, autolysis beyond the desired point is to be avoided and the inclination of the derived proteins in the solution to synthesize and form unpalatable Plasteins and which because they are larger cannot become diffused into the flesh thus failing to perform an important function, must be arrested. In other words, the liquefaction product must be stabilized at a desired point.

After sterilization, the liquid is separated from the solids by suitable means and the liquid is drained off to form the preservative, leaving the solids in the form of a coherent cake which may be used as a by-product, as for instance, for animal feed or for fertilizer.

I have discovered that the stabilzation, as well as other important functions, may be accomplished by the introduction of a fermentable carbohydrate in the liquid.

A practical and inexpensive fermentable carbohydrate is milk powder, which contains lactose, and it may be added to the liquefaction product once or more times, either before completion of the liquefaction process or thereafter and in most cases where added only once, preferably thereafter. Glucose, sucrose or any mono- or poly-saccharide which induces the microbes to follow a fermentative pathway in their metabolism may also be used. I may use a substance such as corn starch, together with a carbohydrase enzyme as amylase capable of decomposing the substance to sugar; others are sucrose catalyzed by sucrace producing glucose and fructose, maltose catalyzed by maltase producing glucose, lactose catalyzed by lactose producing glucose and galaxtose.

The carbohydrate does several things. Any fermentable carbohydrate when mixed with proteins containing active enzymes seems either to inactivate these enzymes or to affect their activity. The autolytic enzymes which would otherwise cause the autolytic break-down are either diverted and obstructed by the carbohydrates, or else because the carbohydrates provide a preferable substrate, these autolytic enzymes follow another pathway of activity which does not cause undesriable changes in odor or taste. Reduction of trimethylamineoxide and production of amino acids which causes the undesirable "fishy" odor and taste is eliminated.

Bacteria which depend upon proteins as a growth medium will decompose proteins to obtain the energy needed. But when carbohydrate is introduced, the organisms will spare the proteins and obtain their energy instead from the carbohydrate which is a more easily available source of energy. The fermentable carbohydrate changes the activity of the bacteria to a fermentative decomposition which is different from the putrefactive break-down and sometimes even represents an attractive change in taste. Fermenting bacteria are less progressive and more easily inactivated than the bacteria pursuing a putrefactive decomposition and require a higher temperature for activity.

As stated above, the synthesis of Plasteins is prevented by the introduction of the carbohydrate with the result that the formation of larger particles and coagulation are prevented and since the number of particles per given volume of liquid is thereby greatly increased and maintained, it follows that the vapor pressure is reduced in proportion thereto, and the freezing point is accordingly lowered. The protein derivatives, peptides and polypeptides in the solution are natural depressants to the autolytic break-down, and since these are stabilized by the carbohydrate which confines them to inactivity, autolysis is further inhibited. The introduction of the carbohydrate itself physically also increases the number of particles per unit volume, further lowering the freezing point. The liquefaction product is, broadly termed, a solution which consists of particles existing in a combined system of solution, colloids, emulsion and suspension, in which the water is colloidally and osmotically bound.

The concentration of the fluid may be further increased as by dehydration after the liquefaction process. It is desirable that by the addition of the carbohydrates or the dehydration or both, the vapor pressure of the liquid be reduced to about 75% of normal or lower.

It is also possible to dehydrate the finished product, for instance, by vacuum at temperatures below 170° F. to a moisture content of down to 30% without further denaturing the proteins. When such dehydration is applied, the product can be stored at normal temperatures over a long period of time with no refrigeration, because there is no water available for microbial growth. In this case only the surface will have to be protected from attack by molds and yeasts, which is achieved when the product is packed tightly with a moisture-resistant wrapper such as used in wrapping of cheese, etc.

What I have provided is a stabilized solution which contains the natural fluids which exist in the flesh in addition to the liquified biologically active proteins, fats, carbohydrates and minerals, but at preferably a higher concentration and which contains natural proteinaceous gelling agents. Essentially it comprises the liquefaction product of a combined at least partial hydrolysis and autolysis of edible flesh and a fermentable carbohydrate additive.

When a fish fillet is dipped into the solution at a temperature preferably above about 50° F., the fillet picks up a relatively large amount of the liquid depending upon the surface area exposed to the solution. By impregnation and surface coating the amount of solution picked up may vary from 5% to 20% of the weight of the fillet. Now when the temperature is reduced below 40° F. the solution which impregnates and coats the flesh begins to form a gel and it is completely gelatinized and solidified at a temperature about 40° F.

The solution which the fillet has picked up usually has a higher concentration than the body fluids of the flesh of the fillet, and the fluids of the flesh and of the solution will behave according to the forces of osmosis, imbibition and the general laws of diffusion. The cells of the flesh will have an increased osmotic concentration, which will prevent the formation of larger ice crystals inside the cells, making these resistant to freezing without disruption and denaturation. There still exists in the flesh disorganized matabolism since, although death has occurred, the enzymes are still present and active. But the cells of the flesh have lost their ability of selective assimilation and they are now in a more apathetic state and inclined to follow the laws of chemistry which gives osmosis, imbibition and diffusion freer play. The solution which is picked up by the fillet will therefore gradually affect all of the body fluids of the flesh including the protoplasma. The solution will impart its tendency to gel to the natural fluids in the meat when temperature is reduced and when the temperature is reduced below 40° F., for instance, to 35° F. all the fluids including the solution picked up by the fillet and the natural fluids in the fillet will gelatinize. As the temperature is further reduced, the gel and the flesh will contract, while the water which is gradually released as the gelation increases is squeezed out toward the surface. This squeezing and contracting action of the gel, referred to as syneresis, will continue as the temperature is further lowered until a point is reached where all the bound water becomes crystalized in minute particles.

In the flesh the various components of the gelled fluids capable of chemical and bio-chemical reaction now have a greatly reduced opportunity of contact and such reactions are therefore substantially depressed or inhibited. As temperature is reduced below 32° F. the contraction will force the meat into a compact mass without interstices. The free water is forced out to the surface of the gel coating and will there form a layer of ice, while the flesh and the fluids inside will have no ice crystals or only micro crystals in such a relatively small amount that they cannot affect the natural characteristics of the flesh. The surface of the meat stored at temperatures below 32° F. will therefore have a double layer, the outer layer consisting of ice and the inner layer consisting of the gel. Both coatings provide an excellent protection against surface dehydration and oxidation. When the temperature is maintained between 32° F. and 40° F., the surface ice will not form but the coherent envelope or coating of gel will nevertheless adequately protect the flesh against dehydration and oxidation.

The keeping qualities of the flesh dipped in the solution will depend upon the quality of the flesh, the amount of solution picked up, and the temperature at which the gelatinized flesh is kept.

A reasonably fresh fish fillet with the skin on and which has picked up about 8% solution will keep for about one month's time in a cooler where the temperature varies between 33° and 40° F. At a temperature of about 25° F. this fillet may be stored for about 3 months without noticeable reduction in freshness. A skinned fillet will pick up more solution, for instance, 20% by weight of the fillet and can stand a temperature down to about 20° F. without ice formation. Such a fillet will remain fresh when stored for over 5 months.

It is important in order to arrive at the lowest possible temperature without destruction of the proteins that the cooling occurs gradually. Thereby the amount of free water which accumulates as the temperature is reduced can extrude to the surface and there will be no free water inside to form crystals. Quick-freezing would prevent the extrusion of the free water which then would crystallize and resist the contracting forces (syneresis) and form larger crystals which would disintegrate the proteins. As the temperature goes down the colloidally and osmotically bound water arrives at new equilibrium, releasing free water. During such freezing the flesh is gradually dehydrated whereby the resistance to destructive frost is proportionately increased.

The fish should first be exposed to a temperature of around 33° F. At this temperature the maximum contraction occurs in the gel without any ice formation on the surface and there is consequently no blocking by ice for the free water which is extruding as the result of the syneresis. Thereafter the temperature can be reduced to around 20° F. or even lower depending on the amount of moisture present and the degree of its freeness, without denaturing the proteins.

The addition of anti-bacterial substances such as the usual anti-biotics, for instance, aureomycin, terramycin and the like will increase the keeping qualities. The value of such substances appears to consist mainly in reducing the multiplication of bacterial organisms in the solution during the interval between its preparation and its application to the flesh.

When fillets treated according to my invention are deep frozen, for instance, at 10° F. below zero the fillets will have considerable advantage over ordinary deep frozen fillets because of the protective nature of the gel coating and impregnation.

Particularly under optimum temperature conditions of storage between 32° F. and 40° F. the flesh actually gains in freshness, richness of taste and nutritive value because of the greater concentration of the solution with which it is impregnated and coated.

In some cases a gelling agent such as starch gelatine or proteinaceous gelatin may be added to the solution.

A modification of the invention consists in a partial or short time preservation of flesh by dipping it in a solution comprising a fermentable carbohydrate such as milk powder, which may be formed by adding the milk powder to the ordinary sodium chloride brine solution which is now commonly used, or by using milk powder in water with or without any additives. The milky fluid will give the flesh an attractive glassy surface, the lactose in the milk will change the enzymetic reactions and the spoilage bacteria will not attack the proteins as a source of energy but will as above described utilize the more easily available energy from the lactose. The autolytic break-down will also be retarded, changed or eliminated because of the changes caused by the lactose in the enzymetic activity as above described. The dipping of the flesh in the modified solution not only retards and depresses bacterial action and autolytic break-down but also the surface oxidation and dehydration are retarded. A fillet of fish dipped in such a solution will remain fresh from three to six days longer than usual. This method may therefore be used for local distribution when no long distance transportation or long periods of storage are involved.

The storage period in this modified process is considerably increased when fermented milk is used in place of the ordinary milk powder as the fermentable carbohydrate, which results probably also from the fact that sour milk contains anti-bacterial substances (anti-biotics) which affect the bacterial organisms. A gelling agent may also be added in the modified solution which adds to the glossiness of the protected surface and increases its ability to protect the surface from oxidation. By binding the water, the gel makes free water less available to the bacterial organisms and prevents it from contact with the flesh during cold storage.

Anti-bacterial substances may also be added if desired.

The liquefaction product of the combined hydrolytic and autolytic process described above has, per se, several other uses in the food industry in addition to its use as a preservative. The solution extracted from fish is a highly concentrated and purified fish stock which may be used in fish soups and chowders. It contains a greater variety of proteins than the usual fish stock which is obtained by cooking over long periods of time and at higher temperatures because the latter process produces proteins which are not heat stable and which coagulate and precipitate out of the solution.

Accordingly, my invention consists in a process for producing a liquefaction product as a new article or composition, a process for treating protein flesh with the product, a new article or process comprising the treated flesh, a modified method of treating flesh and the modified new article or composition consisting of the flesh so treated.

A few of many possible specific examples of my invention are as follows:

Example 1

Fish trimmings or waste from the filleting table consisting of the frames or carcasses with the heads on from gutted fillet fish are crushed by passing them between two rolls, and a coarse disintegration is sufficient. The disintegrated waste is accumulated in a kettle which is equipped with an automatic stirrer and heat control. The kettle may be jacketed and heated by steam which is run through the jacket. I add water to the kettle to the extent of 5% based on the weight of the fish and I add sodium chloride to make a solution between 5% and 20% in strength. I now commence heating the kettle and stirring the waste and after about 10 minutes I add hydrochloric acid in an amount sufficient to lower the pH to between 5.0 and 6.5. I continue raising the temperature and stirring until about 5 minutes later the temperature reaches about 100° F. at which point I add a protease of the Trypsin type which is readily available on the market for use in processing foods, although any other proteolytic enzyme will do. Stirring is continued and in about 15 minutes the temperature is gradually raised to about 200° F. At this point all the proteins from the living cells plus the lipids and carbohydrates and other soluble parts such as minerals will have been dissolved. The contents of the kettle are now poured into a press similar to an apple cider press which contains a strainer over the outlet to hold back the non-dissolved components. When pressure is applied the solution will be squeezed out while the solids are retained in the process as a coherent cake which may be used for animal food or fertilizer. The solution which is drained off will now have a concentration of from 12 to 15% solids. To this solution I now add milk which may either be whole milk or skimmed milk or concentrated milk or dehydrated powered milk. In the case of powdered milk I add about 10% by weight of the solution and in the case of liquid milk the amount is equivalent. The solution may be used at once or may be stored in a cooler or freezing room.

In use the solution replaces the brine in the ordinary treatment tank through which the fillets are now passed in the otherwise normal processing and packing procedure. As the solution is picked up by the fillets it must be replaced in the tank.

The fillets which have been dipped and packed are stored in an ordinary cooler between 32° F. and 40° F. For long storage periods the fillets should be kept at temperatures between 22° to 25° F.

Example 2

I proceed as in Example 1 except that after I separate the liquid from the solid I dilute this solution until concentration is 5% and I add milk powder in the amount of 5% by weight of the whole. To this I add 5% sodium chloride based on the liquid content and the resulting solution is now used in the treatment tank as in Example 1. This treatment solution is "stretched" and is therefore less expensive while providing many of the desirable characteristics of the more concentrated solution.

Example 3

I proceed as in Example 1 except that in place of milk I substitute corn starch in an amount of 5% by weight of the whole and I also add a carbohydrase enzyme such as amylase in sufficient amount to decompose the starch to sugar.

Example 4

Instead of using an extracted solution as in the first three examples, I provide a solution consisting of 5% dry acidic milk and 10% sodium chloride. This solution is used in the treatment tank and the fish is processed as described above.

Example 5

I proceed as in Example 1 except that I omit the sodium chloride.

Example 6

I proceed as in Example 1 except that I omit the hydrochloric acid.

Example 7

I proceed as in Example 1 except that I omit the sodium chloride and the hydrochloric acid.

Example 8

I proceed as in Example 1 except that I omit the protease.

Example 9

I proceed as in Example 1 except that I omit the sodium chloride, the acid and the protease.

Example 10

I proceed as in Example 1 and to the liquid I add a gelling agent.

Example 11

I proceed as in Example 10 and to the liquid I add the anti-bacterial substance aureo-mycin.

Example 12

Instead of using an extracted solution I use powdered full milk powder in a concentration of 10% without any other additives. This solution is used in the treatment tank and the fish fillets are dipped therein and stored at a temperature below 40° F.

Example 13

As a treatment solution in place of an extracted solution I use acidic milk powder in a concentration of 12% in solution, to which I add aureo-mycin as an anti-bacterial agent in an amount of 10 parts per million.

I claim:

The method of preserving edible flesh which includes disintegrating the waste of like flesh, adding water, raising the temperature of the disintegrated flesh and water to a temperature below the boiling point thereof, straining out the undissolved components, adding from about 5% to about 10% by weight of the disintegrated flesh and water of a fermentable carbohydrate selected from the group consisting of milk and corn starch, immersing the flesh to be preserved in the disintegrated flesh and water and storing at a low temperature.

References Cited in the file of this patent

UNITED STATES PATENTS

| | | |
|---|---|---|
| 1,164,034 | Thorsen | Dec. 14, 1915 |
| 1,876,090 | Strasburger | Sept. 6, 1932 |
| 2,185,451 | Webb | Jan. 2, 1940 |
| 2,676,107 | Hestnes | Apr. 20, 1954 |
| 2,772,168 | King | Nov. 27, 1956 |